(12) United States Patent
Raasakka et al.

(10) Patent No.: US 11,567,216 B2
(45) Date of Patent: Jan. 31, 2023

(54) SINGLE DELTA RANGE DIFFERENCES USING SYNTHETIC CLOCK STEERING

(71) Applicant: Honeywell International Inc., Morris Plains, NJ (US)

(72) Inventors: Jussi Raasakka, Brno (CZ); Zdenek Kana, Dubnany (CZ); Milos Sotak, Košice-Šaca (SK)

(73) Assignee: Honeywell International Inc., Charlotte, NC (US)

( * ) Notice: Subject to any disclaimer, the term of this patent is extended or adjusted under 35 U.S.C. 154(b) by 226 days.

(21) Appl. No.: 16/877,200

(22) Filed: May 18, 2020

(65) Prior Publication Data

US 2021/0356602 A1 Nov. 18, 2021

(51) Int. Cl.
*G01S 19/21* (2010.01)

(52) U.S. Cl.
CPC .................. *G01S 19/215* (2013.01)

(58) Field of Classification Search
CPC ......... G01S 19/21; G01S 19/215; G01S 19/22
See application file for complete search history.

(56) References Cited

U.S. PATENT DOCUMENTS

| | | |
|---|---|---|
| 5,557,284 A | 9/1996 | Hailman |
| 6,480,787 B2 * | 11/2002 | Yoshikawa ............ G01S 19/23 701/470 |
| 7,180,445 B2 | 2/2007 | Martin et al. |
| 7,724,184 B2 | 5/2010 | Waid |
| 7,760,138 B2 | 7/2010 | Martin et al. |
| 7,821,454 B2 * | 10/2010 | Xie ........................ G01S 19/20 342/357.58 |
| 9,423,501 B2 | 8/2016 | Revol et al. |

(Continued)

FOREIGN PATENT DOCUMENTS

| | | |
|---|---|---|
| CN | 110673168 A | 1/2020 |
| EP | 0904551 B1 | 5/2000 |
| WO | 2019162839 A1 | 8/2019 |

OTHER PUBLICATIONS

Kaplan, Elliott D. et. al., "Understanding GPS Principles and Applications", Artech House, 2nd ed., 2006 (Year: 2006), pp. 216-218 (Year: 2006).*

(Continued)

*Primary Examiner* — Cassi J Galt
(74) *Attorney, Agent, or Firm* — Fogg & Powers LLC (57) ABSTRACT

Systems and methods for calculating single delta range differences using synthetic clock steering are provided. In certain embodiments, a system includes a first GNSS receiver that provides first delta range measurements and first measurement times associated with a plurality of GNSS satellites. The system further includes a second GNSS receiver that provides second delta range measurements and second measurement times associated with the plurality of GNSS satellites. Additionally, the system includes a processing unit that executes instructions that cause the processing unit to synchronize the second delta range measurements with the first delta range measurements to create synchronized delta range measurements. The executable instructions also cause the processing unit to calculate a single difference of the first delta range measurements and the synchronized delta range measurements for at least one satellite in the plurality of GNSS satellites.

16 Claims, 3 Drawing Sheets

(56) References Cited

U.S. PATENT DOCUMENTS

| | | | |
|---|---|---|---|
| 9,568,321 B2 | 2/2017 | Bharadwaj et al. | |
| 10,094,930 B2 | 10/2018 | Schipper et al. | |
| 11,099,277 B2* | 8/2021 | Ohev Zion | G01C 21/165 |
| 2002/0032525 A1 | 3/2002 | Koshikawa et al. | |
| 2009/0128407 A1 | 5/2009 | Xie et al. | |
| 2016/0377726 A1 | 12/2016 | Schipper et al. | |

OTHER PUBLICATIONS

European Patent Office, "Extended European Search Report from EP Application No. 21171057.9", from Foreign Counterpart to U.S. Appl. No. 16/877,200, dated Oct. 29, 2021, pp. 1 through 9, Published: EP.

* cited by examiner

SINGLE DELTA RANGE DIFFERENCES USING SYNTHETIC CLOCK STEERING

BACKGROUND

Navigation systems, often mounted to vehicles (and sometimes objects), acquire information about the movement, position, and orientation of the associated vehicle. The navigation systems use the acquired information to calculate navigation data for the vehicle. To acquire the information used to calculate the navigation data, some navigation systems may include a sensor set having an inertial measurement unit (IMU) and/or a GNSS antenna/receiver that provide measurements related to vehicle movement and vehicle position.

Additionally, safety-critical navigation applications may use these navigation systems to provide the navigation information used during operation. In safety-critical navigation applications, it is important to ensure that the sensors are providing reliable measurements. Accordingly, some devices may monitor the measurements and other output provided by the sensors to gauge the health of the sensors and the integrity of measurements provided by the sensors in the navigation system.

SUMMARY

Systems and methods for calculating single delta range differences using synthetic clock steering are provided. In certain embodiments, a system includes a first GNSS receiver that provides first delta range measurements and first measurement times associated with a plurality of GNSS satellites. The system further includes a second GNSS receiver that provides second delta range measurements and second measurement times associated with the plurality of GNSS satellites. Additionally, the system includes a processing unit that executes instructions that cause the processing unit to synchronize the second delta range measurements with the first delta range measurements to create synchronized delta range measurements. The executable instructions also cause the processing unit to calculate a single difference of the first delta range measurements and the synchronized delta range measurements for at least one satellite in the plurality of GNSS satellites.

DRAWINGS

Understanding that the drawings depict only some embodiments and are not therefore to be considered limiting in scope, the exemplary embodiments will be described with additional specificity and detail using the accompanying drawings, in which.

In accordance with common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made.

Embodiments discussed herein provide for systems and methods for calculating single delta range differences using synthetic clock steering. Some navigation systems may include multiple global navigation satellite system (GNSS) receivers to increase the accuracy and reliability of GNSS measurements. Each of the multiple GNSS receivers may receive signals from the visible GNSS satellites at different times. Using information provided from the GNSS receivers, a processing unit may time synchronize measurements from the GNSS receivers. By time synchronizing the measurements from the different GNSS receivers, the processing unit may increase the reliability of calculated navigation data that is based on the received GNSS measurements.

In some embodiments, the GNSS receivers may provide delta range measurements to a processing unit at different measurement times. To facilitate communication between the GNSS receivers and the processing unit, the GNSS receivers may provide information measurements that are compliant with a defined communication standard. For example, the Aeronautical Radio, Inc. (ARINC) has adopted a standard for the communications from a GNSS receiver under ARINC 743A. The standard may associate labels in message formats with information that enables the processing unit to time synchronize measurements provided by the connected GNSS receivers. For example, the processing unit may find a first label associated with delta range measurements and another label associated with measurement times within a received message. Using the information received from the GNSS receivers, a processing unit may time synchronize measurements of the separate GNSS receivers.

In certain embodiments, a navigation system may use the time synchronized measurements to detect GNSS spoofing. As used herein, the term "spoofing" may refer to attempts to cause a GNSS receiver to produce misleading information. Typically, spoofing involves the broadcasting of fake GNSS signals that resemble normal GNSS signals from non-GNSS satellite sources. When a receiver attempts to compute the receiver location, the fake GNSS signals may cause the location to be incorrect and potentially misleading. The resemblance of the fake GNSS signals to the authentic GNSS signals make it difficult for a normal GNSS receiver to distinguish the fake GNSS signals. In practice, spoofing has caused aviation GNSS receivers to produce false information and fears exist that spoofing attacks may be used to bring down aircraft. As many in the world increasingly rely on GNSS receivers for providing users accurate and reliable information, the detection and of spoofing becomes an increasingly important task.

Many techniques have been developed to detect spoofing, one such technique uses range differences between two closely located GNSS receivers that are each visible to a particular satellite. From the range differences, it is possible to calculate the Line-Of-Sight (LOS) vector towards each tracked satellite. However, successfully calculating the LOS vector towards each tracked satellite uses measurements from the closely located GNSS receivers that are time synchronized. By performing synthetic clock steering, the measurement times from different GNSS receivers may be synchronized and the dual GNSS receivers may be used for spoofing detection.

Figure 1:
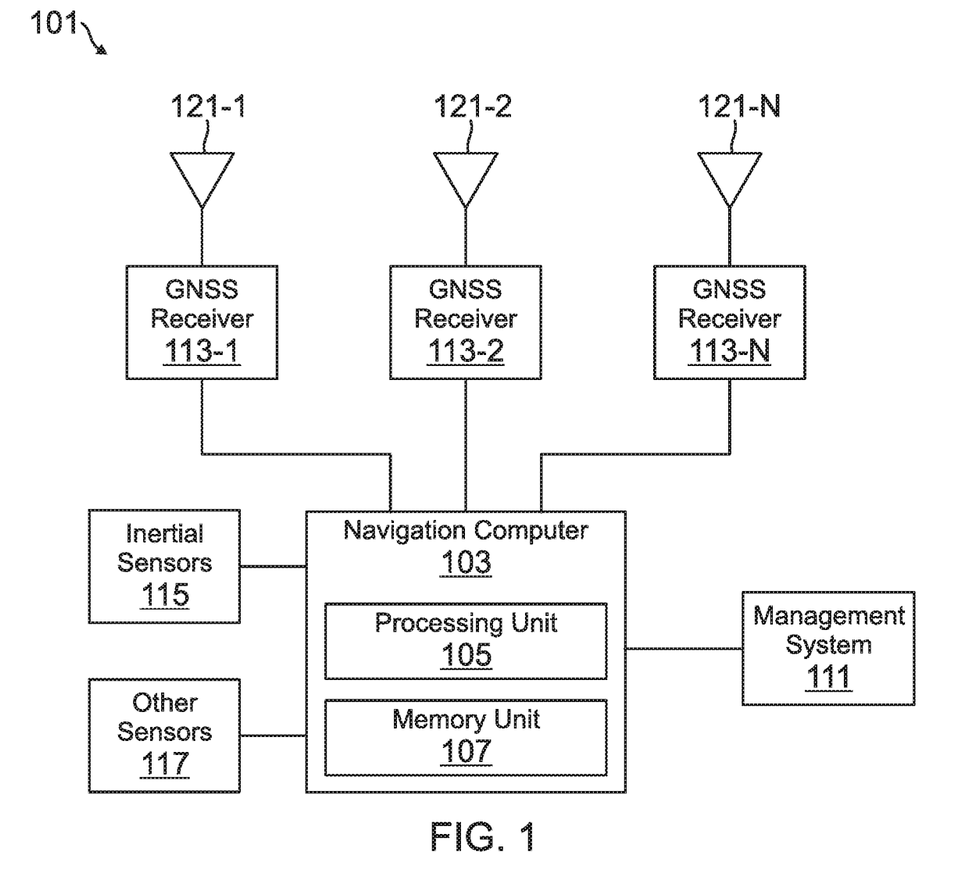
FIG. 1 is a block diagram illustrating an exemplary navigation system according to an aspect of the present disclosure.

FIG. 1 is a block diagram of a navigation system 101 that can perform synthetic clock steering using single delta range differences. The navigation system 101 may be mounted to a vehicle, such as an aircraft, sea craft, spacecraft, automobile, or other type of vehicle. Alternatively, the navigation system 101 may be located on or as part of a movable object, such as a phone, personal electronics, land surveying equipment, or other object that is capable of being moved from one location to another. The navigation system 101 may acquire navigation information from one or more different sources. To handle the acquired navigation information, the navigation system 101 may include a navigation computer 103. The navigation computer 103 may further include at least one processing unit 105 and at least one memory unit 107.

In certain embodiments, the navigation system 101 may acquire navigation information that includes inertial motion information. To acquire the inertial motion information, the navigation system 101 may include inertial sensors 115 that measure and sense the inertial motion of the object mounted to the navigation system 101. For example, the navigation system 101 may be an inertial navigation system (INS) that receives raw inertial data from a combination of inertial sensors 115, such as gyroscopes and accelerometers. Alternatively, the inertial sensors 115 may be an INS that provides processed inertial navigation data acquired from inertial measurements to the navigation computer 103.

In further embodiments, the navigation system 101 may include a number of additional sensors that can provide navigation data. For example, the navigation system 101 may include one or more other sensors 117. For example, the one or more other sensors 117 may include a vertical position sensor such as an altimeter. Also, the one or more other sensors 117 may include electro-optical sensors, magnetometers, barometric sensors, velocimeters, and/or other types of sensors.

In certain embodiments, the navigation system 101 may use GNSS measurements to determine navigation information, the navigation system 101 may include multiple GNSS receivers 113-1-113-N (hereinafter referred to generally and/or collectively as GNSS receiver(s) 113), each GNSS receiver 113 coupled to an associated antenna 121-1-121-N (hereinafter referred to generally and/or collectively as antenna(s) 121). The antennas 121 may be separate antennas or an antenna array that uses beam-steering to acquire GNSS signals for the different GNSS receivers 113. Each of the GNSS receivers 113 may be coupled to receive satellite signals from multiple GNSS satellites that are observable through an associated antenna 121.

In some circumstances, the same set of satellites may be observable to each of the different GNSS receivers 113. In other circumstances, different sets of satellites may be observable to each, or some of, the different GNSS receivers 113. For example, the set of satellites observed by a particular GNSS receiver 113 may be dependent on the mounting location of the associated antenna on the vehicle or object associated with the navigation system 101. For example, portions of a vehicle (i.e., a wing, fuselage, etc.) may obscure one or more satellites from one of the antennas 121 mounted on the vehicle or object. As used herein, the GNSS satellites may be any combination of satellites that provide navigation signals according to any global navigation satellite system communication standard. For example, the GNSS satellites may be part of the global positioning system (GPS), GLONASS, Galileo system, COMPASS (BeiDou), or other system of satellites that form part of a GNSS. The GNSS satellites may provide location information anywhere on the Earth. The processing unit 105 and GNSS receivers 113 may receive the satellite signals and extract position, velocity and time data from the signals to acquire pseudorange measurements that may be used to identify navigation information for the vehicle associated with the navigation system 101.

The processing unit 105 and/or other computational devices used in the navigation system 101, management system 111, or other systems and methods described herein may be implemented using software, firmware, hardware, or appropriate combination thereof. The processing unit 105 and other computational devices may be supplemented by, or incorporated in, specially-designed application-specific integrated circuits (ASICs) or field programmable gate arrays (FPGAs). In some implementations, the processing unit 105 and/or other computational devices may communicate through an additional transceiver with other computing devices outside of the navigation system 101, such as those associated with the management system 111 or computing devices associated with other subsystems controlled by the management system 111. The processing unit 105 and other computational devices may also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor, such as the processing unit 105. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device. For instance, the memory unit 107 may be an example of a computer readable medium capable of storing computer readable instructions and/or data structures. Also, the memory unit 107 may store navigational information such as maps, terrain databases, magnetic field information, path data, and other navigation information.

Suitable computer readable storage media (such as the memory unit 107) may include, for example, non-volatile memory devices including semi-conductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

In certain embodiments, navigation measurements may be subject to various errors and faults. To increase the accuracy of the measurements provided by the GNSS receivers 113, the processing unit 105 may perform synthetic clock steering using single delta range differences. The synthetic clock steering using single delta range differences may be performed using delta range measurements and receiver measurement times provided by the GNSS receivers 113 to the processing unit 105. Additionally, the delta range measurements may be made based on carrier phase observables. As discussed above, the delta range measurements and the receiver measurement times may be conveyed from the GNSS receivers 113 to the processing unit 105 within messages having a format that is defined within a communication standard. For example, the GNSS receivers 113 may communicate the delta range measurements and the receiver measurement times through labels defined within the ARINC 743A standard. Alternatively, the GNSS receivers 113 may communicate the delta range measurements and the receiver measurement times to the processing unit 105 within other standardized or non-standardized message formats.

Figure 2:
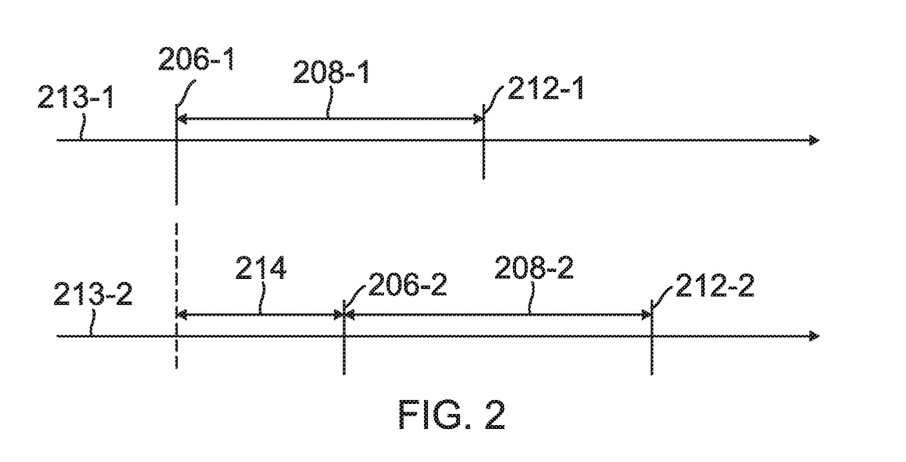
FIG. 2 is a graph illustrating the reception of measurements by different GNSS receivers at different times according to an aspect of the present disclosure.

In some embodiments, when the processing unit 105 receives the delta range measurements and the receiver measurement times, the processing unit 105 may perform various calculations when performing synthetic clock steering. For example, FIG. 2 shows a first graph 213-1 that illustrates the receiver measurement times for a first GNSS receiver 113-1 and a second graph 213-2 that illustrates the receiver measurement times for a second GNSS receiver 113-2. As shown, the first GNSS receiver 113-1 may receive measurements from a particular satellite at different times than the second GNSS receiver 113-2. The processing unit 105 may then use information provided from the GNSS receivers 113-1 and 113-2 to synchronize the different measurements.

As illustrated in the first graph 213-1, the first GNSS receiver 113-1 may receive a first measurement at time 206-1. After the passage of a first time period 208-1, the first GNSS receiver 113-1 may receive a second measurement at time 212-1. As illustrated in a similar manner in the graph 213-2, the second GNSS receiver 113-2 may receive the first measurement at time 206-2. After the passage of a second time period 208-2, the second GNSS receiver 113-2 may receive a second measurement at time 212-2. As shown, the reception times of the measurements by the second GNSS receiver 113-2 may lag behind the reception times of the measurements by the first GNSS receiver 113-1 by a delay 214. The differences in the measurement times by the first GNSS receiver 113-1 and the second GNSS receiver 113-2 may be dependent on the internal clocks of the first GNSS receiver 113-1 and the second GNSS receiver 113-2. As stated above, based on the measurements and the measurement times, the processing unit 105 may synchronize the measurements provided by the different GNSS receivers 113 with one another.

In certain embodiments, to synchronize the delta range measurements between different GNSS receivers 113, the processing unit 105 may calculate the range rate for a particular satellite at an epoch for each GNSS receiver 113. To calculate the range rate, the processing unit 105 may divide a delta range measurement for a satellite over an epoch by the duration of the epoch. A GNSS receiver 113 may provide the delta range measurement over an epoch and time measurements associated with the start and end of the epoch to the processing unit 105. The data provided by the receiver may be provided in compliance with the ARINC 743A standard. For example, the GNSS receivers 113 may provide the delta range measurement according to the label 064 of the ARINC 743A standard and the time measurements according to the labels 140/141 of the ARINC 743A standard. In some examples, the processing unit 105 may perform the following calculation:

$$RR_n = \frac{\Delta R_n}{t_n - t_{n-1}},$$

where $RR_n$ may be equal to the range rate of a satellite at an epoch n as measured by a GNSS receiver 113, the $\Delta R_n$ may be a delta range measurement provided by a GNSS receiver 113, and the $t_n$, and $t_{n-1}$ may refer to time measurements associated with both the beginning and end of the epoch n.

In some embodiments, when the range rate has been calculated for two or more GNSS receivers 113, the processing unit 105 may synchronize the delta range measurements from the various GNSS receivers 113 to one of the GNSS receivers 113. For example, the processing unit 105 may synchronize the second GNSS receiver 113-2 to the first GNSS receiver 113-1 by multiplying subsequently calculated range rates for the second GNSS receiver 113-2 by differences between time measurements acquired by the first GNSS receiver 113-1 and the second GNSS receiver 113-2, and then adding the results together. In a particular example, the processing unit 105 may synchronize the delta range measurements provided by the second GNSS receiver 113-2 according to the following equation:

$$\Delta SR_n = RR_{n-1} * (t_{n-1_{R2}} - t_{n-1_{R1}}) + RR_n * (t_{n_{R1}} - t_{n-1_{R2}}).$$

As shown in the equation, the $RR_{n-1}$ may refer to a calculated range rate for a satellite as calculated by the second receiver 113-2 at time epoch n−1. Similarly, the $RR_n$ may refer to a calculated range rate for a satellite as calculated by the second receiver 113-2 at time epoch n. The processing unit 105 may multiply $RR_{n-1}$ by the time difference of $t_{n-1}$ as measured by the second GNSS receiver 113-2 and $t_{n-1}$ as measured by the first GNSS receiver 113-1. Additionally, the processing unit 105 may multiply $RR_n$ by the time difference of $t_n$ as measured by the first GNSS receiver 113-1 and $t_{n-1}$ as measured by the second GNSS receiver 113-2.

In certain embodiments, when the processing unit 105 has synchronized different measurements between different GNSS receivers 113, the processing unit 105 may construct single differences of delta range measurements of common space vehicle measurements for the various time epochs. In some implementations, the processing unit 105 may construct single differences of the delta range measurements for each time epoch. To construct the single differences for a particular satellite or space vehicle, the processing unit 105 may subtract a synchronized delta range measurement for the satellite for a second GNSS receiver 113-2 from the delta range measurement for the first GNSS receiver 113-1. For example, the processing unit 105 may perform the following calculation:

$$SD_x = \Delta R_{x_{R1}} - \Delta SR_{x_{R2}}.$$

As shown, the $SD_x$ may represent a single difference of delta range measurements for a particular space vehicle x. The $\Delta R_{x_{R1}}$ may represent a delta range measurement for a particular space vehicle x that was calculated from a first receiver $R_1$ (such as the first GNSS receiver 113-1). The $\Delta SR_{x_{R2}}$ may represent a synchronized delta range measurement for a particular space vehicle x that was calculated from a second receiver R2 (such as the second GNSS receiver 113-2). The processing unit 105 may perform similar calculations for each of the space vehicles or satellites. By synchronizing the delta range measurements and calculating single differences of the synchronized delta range measurements, the reliability of measurements received from the GNSS receivers 113 may be improved.

Figure 3:
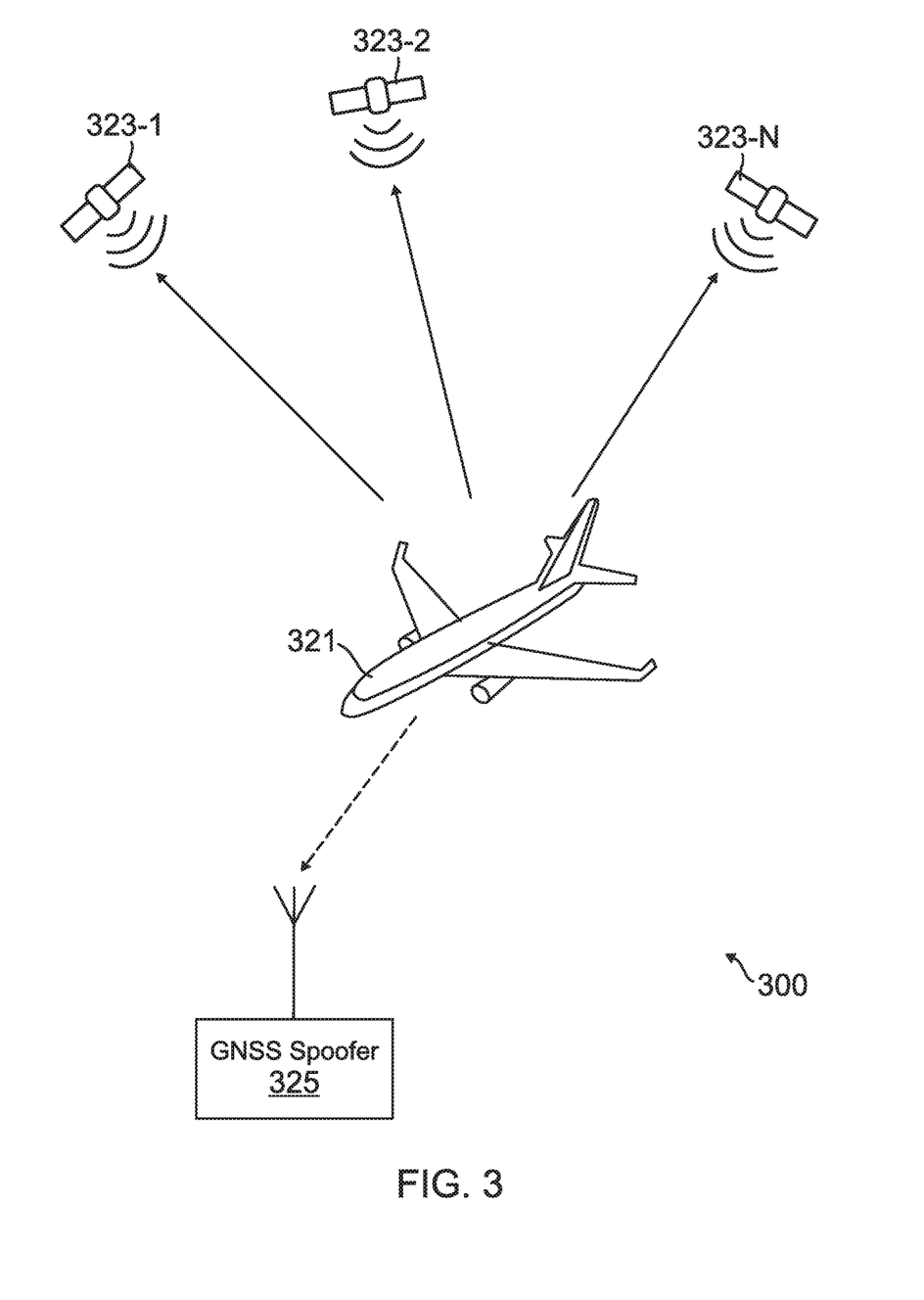
FIG. 3 is a diagram of an aircraft receiving GNSS signals and spoofed GNSS signals according to an aspect of the present disclosure.

FIG. 3 is a diagram of a network 300 illustrating a mobile platform 321 in communication with GNSS satellites 323-1-323-N (referred to generally and collectively as GNSS satellite(s) 323). The mobile platform 321 may be any vehicle type or movable object having a navigation system, such as the navigation system 101 described above in FIG. 1. The navigation system 101 on the mobile platform 321 may have multiple GNSS receivers 113 to help with the detection of spoofing signals produced by spoofers such as GNSS spoofer 325.

In certain embodiments, the navigation system 101 may calculate single delta range differences for each of the sources of GNSS signals in communication with two or more GNSS receivers 113. For example, if two or more GNSS receivers are tracking the signal produced by the GNSS spoofer 325, the LOS vectors may be equal for all of the signals supposedly produced by the GNSS satellites 323, as the GNSS spoofer 325 attempts to mimic the signals produced by the GNSS satellites 323. If the LOS vectors between the satellites 323, the single delta range differences will also be equal. The information regarding single delta range differences may be compared against a threshold to detect spoofing or the information may be combined with known satellite elevation and azimuth for an increased spoofing detection algorithm.

Figure 4:
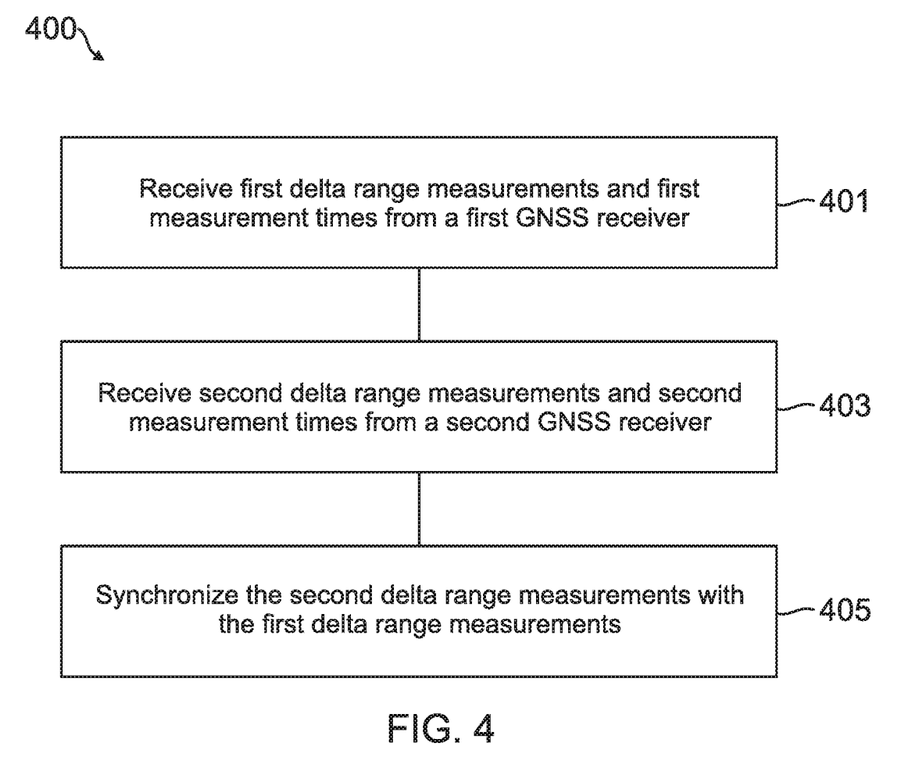
FIG. 4 is a flowchart diagram illustrating an exemplary method for calculating single delta range differences using synthetic clock steering according to an aspect of the present disclosure.

FIG. 4 is a flow chart diagram of a method 400 for calculating single delta range differences using synthetic clock steering. The method 400 proceeds at 401, where first delta range measurements and first measurement times are received from a first GNSS receiver. Additionally, the method 400 proceeds at 403, where second delta range measurements and second measurement times are received from a second GNSS receiver. Further, the method 400 proceeds at 405, where the second delta range measurements are synchronized with the first delta range measurements.

Example Embodiments

Example 1 includes a system comprising: a first GNSS receiver that provides first delta range measurements and first measurement times associated with a plurality of GNSS satellites; a second GNSS receiver that provides second delta range measurements and second measurement times associated with the plurality of GNSS satellites; and a processing unit that executes instructions that cause the processing unit to: synchronize the second delta range measurements with the first delta range measurements to create synchronized delta range measurements; and calculate a single difference of the first delta range measurements and the second delta range measurements for at least one satellite in the plurality of GNSS satellites.

Example 2 includes the system of Example 1, wherein the first GNSS receiver and the second GNSS receiver provide data within messages that are formatted according to a communication standard.

Example 3 includes the system of Example 2, wherein the communication standard is at least one of: an ARINC 743A standard; an other standardized message format; and a non-standardized message format.

Example 4 includes the system of any of Examples 1-3, wherein the processing unit synchronizes the first delta range measurements and the second delta range measurements by calculating synchronized delta range measurements for the second delta range measurements.

Example 5 includes the system of Example 4, wherein calculating the synchronized delta range measurements comprises: calculating a second range rate for the second delta range measurements at a first measurement time and a second measurement time; and adding the second range rate for the first measurement time that is multiplied by a difference in first measurement times for the second GNSS receiver and the first GNSS receiver by a difference between the second range rate for the second measurement time that is multiplied by a difference in the second measurement time for the first GNSS receiver and the first measurement time for the second GNSS receiver.

Example 6 includes the system of Example 5, wherein the processing unit calculates the second range rate by dividing the delta range measurement by the difference between the second measurement time and the first measurement time.

Example 7 includes the system of any of Examples 4-6, wherein the processing unit calculates the single difference by subtracting the synchronized delta range measurements from the first delta range measurements between the first GNSS receiver and the second GNSS receiver.

Example 8 includes the system of any of Examples 1-7, wherein the first delta range measurements and the second delta range measurements are made from carrier phase observables.

Example 9 includes the system of any of Examples 1-8, wherein the processing unit is configured to detect spoofing of GNSS signals by comparing the single differences of the first delta range measurements and the synchronized delta range measurements from GNSS measurements from the plurality of GNSS satellites.

Example 10 includes a method comprising: receiving first delta range measurements and first measurement times from a first GNSS receiver, wherein a first measurement time indicates a time of measurement of a first delta range measurement; receiving second delta range measurements and second measurement times from a second GNSS receiver, wherein a second measurement time indicates a time of measurement of a second delta range measurement; and synchronizing the second delta range measurements with the first delta range measurements to create synchronized delta range measurements.

Example 11 includes the method of Example 10, wherein the first GNSS receiver provides the first delta range measurements and the first measurement times and the second GNSS receiver provides the second delta range measurements and the second measurement times within messages that are formatted according to a communication standard.

Example 12 includes the method of Example 11, wherein the communication standard is at least one of: an ARINC 743A standard; an other standardized message format; and a non-standardized message format.

Example 13 includes the method of any of Examples 10-12, wherein synchronizing the second delta range measurements with the first delta range measurements comprises calculating synchronized delta range measurements for the second delta range measurements.

Example 14 includes the method of Example 13, wherein calculating the synchronized delta range measurements for the second delta range measurements comprises: calculating a second range rate for the second delta range measurements at a first time and a second time; and adding the second range rate for the first time that is multiplied by a difference in an associated first measurement time for the second GNSS receiver and the first GNSS receiver by a difference between the second range rate for the second time that is multiplied by a difference in an associated second measurement time for the first GNSS receiver and the associated first measurement time for the second GNSS receiver.

Example 15 includes the method of Example 14, further comprising calculating the second range rate by dividing the delta range measurement by the difference between the associated second measurement time and the associated first measurement time.

Example 16 includes the method of any of Examples 10-15, further comprising calculating a single difference of the first delta range measurements and the synchronized delta range measurements for at least one satellite in a plurality of GNSS satellites.

Example 17 includes the method of Example 16, wherein calculating the single difference comprises subtracting synchronized delta range measurements from the first delta range measurements between the first GNSS receiver and the second GNSS receiver.

Example 18 includes the method of any of Examples 10-17, further comprising detecting spoofing of GNSS signals by comparing a single differences of the first delta range measurements and the synchronized delta range measurements from GNSS measurements for a plurality of GNSS measurements.

Example 19 includes a system comprising: a first GNSS receiver that provides first delta range measurements and first measurement times associated with a plurality of GNSS satellites; a second GNSS receiver that provides second delta range measurements and second measurement times associated with the plurality of GNSS satellites; and a processing unit that executes instructions that cause the processing unit to synchronize the first delta range measurements and the second delta range measurements to create synchronized delta range measurements.

Example 20 includes the system of Example 19, wherein the processing unit is further configured to calculate a single difference of the first delta range measurements and the synchronized delta range measurements for at least one satellite in the plurality of GNSS satellites.

Example 20 includes the system of any of Examples 18-19, wherein the first GNSS receiver and the second GNSS receiver provide data within messages that are formatted according to at least one of: an ARINC 743A standard; an other standardized message format; and a non-standardized message format.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
   a first GNSS receiver that provides first delta range measurements and first measurement times associated with a plurality of GNSS satellites;
   a second GNSS receiver that provides second delta range measurements and second measurement times associated with the plurality of GNSS satellites; and
   a processing unit that executes instructions that cause the processing unit to:
      synchronize the second delta range measurements with the first delta range measurements to calculate synchronized delta range measurements for the second delta range measurements, wherein calculating the synchronized delta range measurements comprises:
         calculating a second range rate for the second delta range measurements at a first measurement time and a second measurement time; and
         adding the second range rate for the second delta range measurements at the first measurement time after multiplying by a difference in first measurement times for the second GNSS receiver and the first GNSS receiver to the second range rate for the second delta range measurements at the second measurement time after multiplying by a difference in the second measurement time for the first GNSS receiver and the first measurement time for the second GNSS receiver; and
      calculate a single difference of the first delta range measurements and the synchronized delta range measurements for at least one satellite in the plurality of GNSS satellites.

2. The system of claim 1, wherein the first GNSS receiver and the second GNSS receiver provide data within messages that are formatted according to a communication standard.

3. The system of claim 2, wherein the communication standard is at least one of:
   an ARINC 743A standard;
   an other standardized message format; and
   a non-standardized message format.

4. The system of claim 1, wherein the processing unit calculates the second range rate by dividing the delta range measurement by the difference between the second measurement time and the first measurement time.

5. The system of claim 1, wherein the processing unit calculates the single difference by subtracting the synchronized delta range measurements from the first delta range measurements between the first GNSS receiver and the second GNSS receiver.

6. The system of claim 1, wherein the first delta range measurements and the second delta range measurements are made from carrier phase observables.

7. The system of claim 1, wherein the processing unit is configured to detect spoofing of GNSS signals by comparing the single differences of the first delta range measurements and the synchronized delta range measurements from GNSS measurements from the plurality of GNSS satellites.

8. A method comprising:
   receiving first delta range measurements and first measurement times from a first GNSS receiver, wherein a first measurement time indicates a time of measurement of a first delta range measurement;
   receiving second delta range measurements and second measurement times from a second GNSS receiver, wherein a second measurement time indicates a time of measurement of a second delta range measurement; and
   synchronizing the second delta range measurements with the first delta range measurements to calculate synchronized delta range measurements for the second delta range measurements, wherein calculating the synchronized delta range measurements for the second delta range measurements comprises:
   calculating a second range rate for the second delta range measurements at a first measurement time and a second measurement time;
   adding the second range rate for the second delta range measurements at the first measurement time that is multiplied by a difference in an associated first measurement time for the second GNSS receiver and the first GNSS receiver by the second range rate for the second delta range measurements at the second measurement time that is multiplied by a difference in an associated second measurement time for the first GNSS receiver and the associated first measurement time for the second GNSS receiver; and providing navigation information associated with a vehicle having the first GNSS receiver and the second GNSS receiver based on the synchronized delta range measurements.

9. The method of claim 8, wherein the first GNSS receiver provides the first delta range measurements and the first measurement times and the second GNSS receiver provides the second delta range measurements and the second measurement times within messages that are formatted according to a communication standard.

10. The method of claim 9, wherein the communication standard is at least one of:
an ARINC 743A standard;
an other standardized message format; and
a non-standardized message format.

11. The method of claim 8, further comprising calculating the second range rate by dividing the delta range measurement by the difference between the associated second measurement time and the associated first measurement time.

12. The method of claim 8, further comprising calculating a single difference of the first delta range measurements and the synchronized delta range measurements for at least one satellite in a plurality of GNSS satellites.

13. The method of claim 12, wherein calculating the single difference comprises subtracting synchronized delta range measurements from the first delta range measurements between the first GNSS receiver and the second GNSS receiver.

14. The method of claim 8, further comprising detecting spoofing of GNSS signals by comparing a single differences of the first delta range measurements and the synchronized delta range measurements from GNSS measurements for a plurality of GNSS measurements.

15. A system comprising:
a first GNSS receiver that provides first delta range measurements and first measurement times associated with a plurality of GNSS satellites;
a second GNSS receiver that provides second delta range measurements and second measurement times associated with the plurality of GNSS satellites; and
a processing unit that executes instructions that cause the processing unit to synchronize the first delta range measurements and the second delta range measurements to calculate synchronized delta range measurements for the second delta range measurements, wherein calculating the synchronized delta range measurements comprises:
calculating a second range rate for the second delta range measurements at a first measurement time and a second measurement time; and
adding the second range rate for the second delta range measurements at the first measurement time after multiplying by a difference in first measurement times for the second GNSS receiver and the first GNSS receiver to the second range rate for the second delta range measurements at the second measurement time after multiplying by a difference in the second measurement time for the first GNSS receiver and the first measurement time for the second GNSS receiver.

16. The system of claim 14, wherein the processing unit is further configured to calculate a single difference of the first delta range measurements and the synchronized delta range measurements for at least one satellite in the plurality of GNSS satellites.

* * * * *